(No Model.) 3 Sheets—Sheet 3.

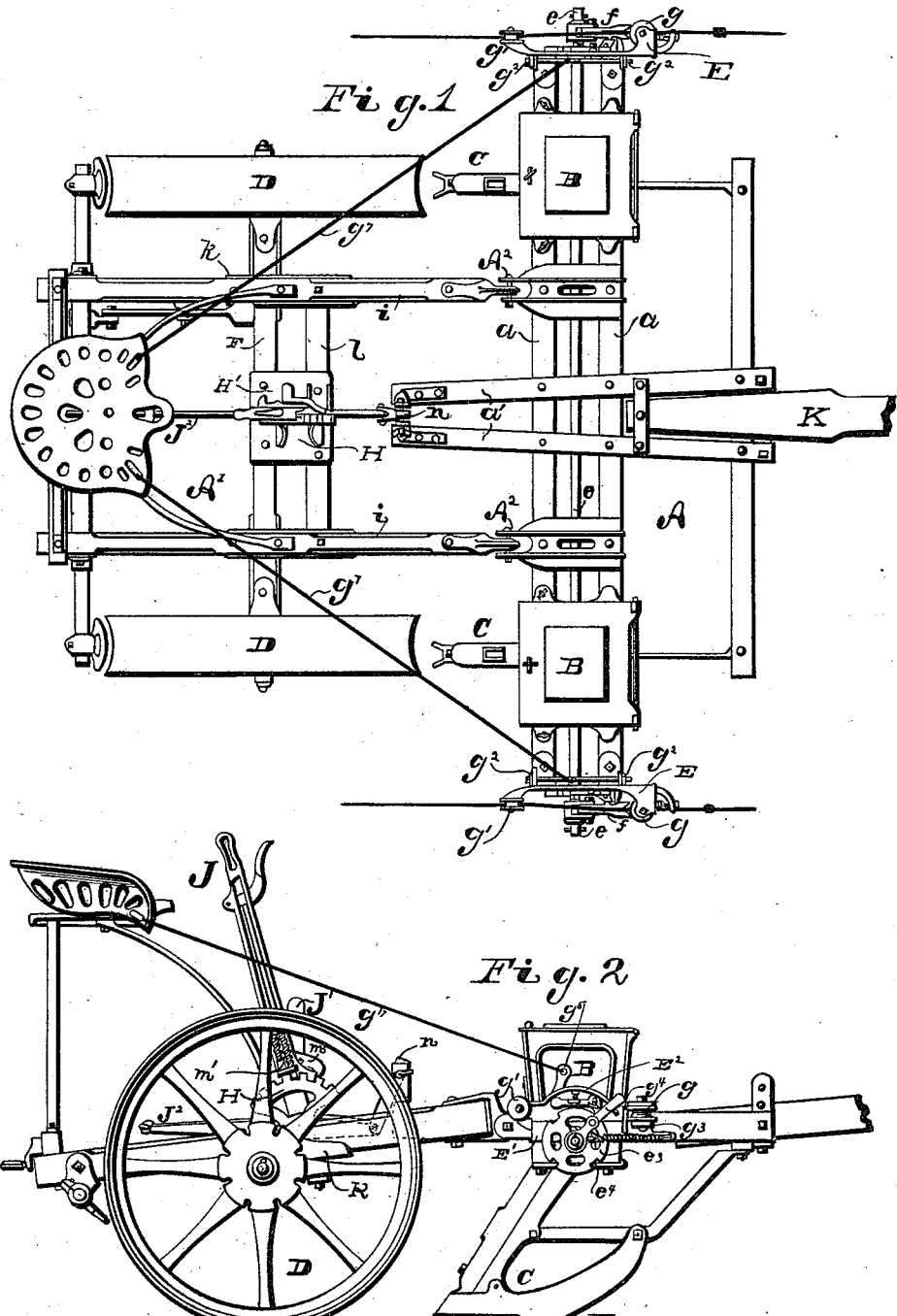

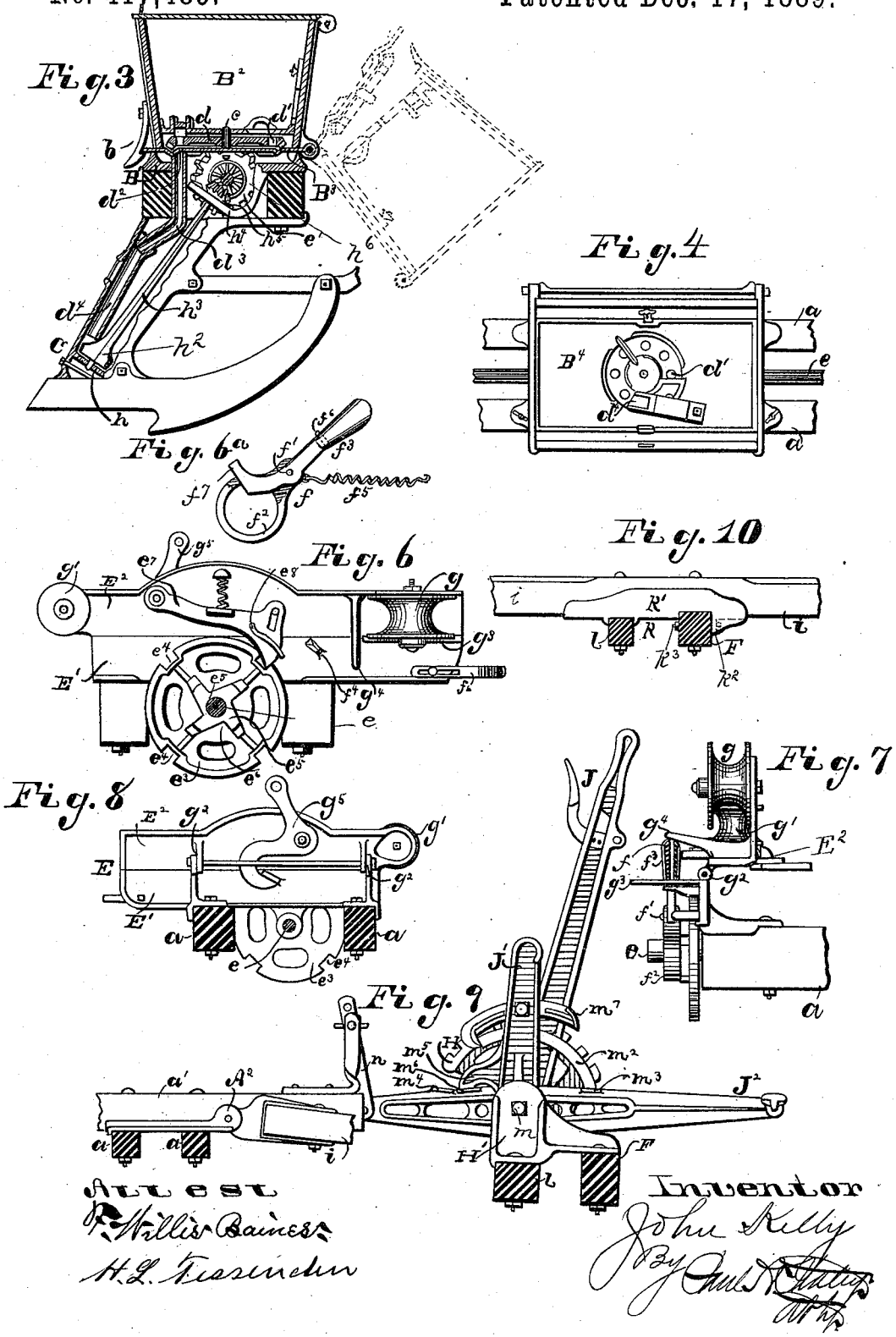

J. KELLY.
CORN PLANTER.

No. 417,489. Patented Dec. 17, 1889.

Attest
Willis Bainck
H. L. Fessenden

Inventor
John Kelly
By

UNITED STATES PATENT OFFICE.

JOHN KELLY, OF TROY, OHIO, ASSIGNOR OF TWO-THIRDS TO ORRIN KELLY AND GEORGE C. KELLY, OF SAME PLACE.

CORN-PLANTER.

SPECIFICATION forming part of Letters Patent No. 417,489, dated December 17, 1889.

Application filed March 15, 1886. Renewed October 5, 1889. Serial No. 326,073. (No model.)

*To all whom it may concern:*

Be it known that I, JOHN KELLY, a citizen of the United States, residing at Troy, in the county of Miami and State of Ohio, have invented certain new and useful Improvements in Corn-Planters, of which the following is a specification.

My invention relates to improvements in corn-planters, the object of my invention being, first, to provide a simple and efficient dropping mechanism whereby the hills are check-rowed; second, to provide an improved construction of grain-hoppers which may be readily opened to examine or remove the dropping-plates without removing the corn in the hopper; third, to provide for automatically removing the check-row wire when desired; fourth, to provide for raising and lowering the planter and to graduate the depth of planting; fifth, to improve the construction of the frame whereby the said frame is strengthened; sixth, to provide for bringing the hills in check by an adjustment of the tongue in relation to the planter. I attain these objects by the mechanism illustrated in the accompanying drawings, in which—

Figure 5:
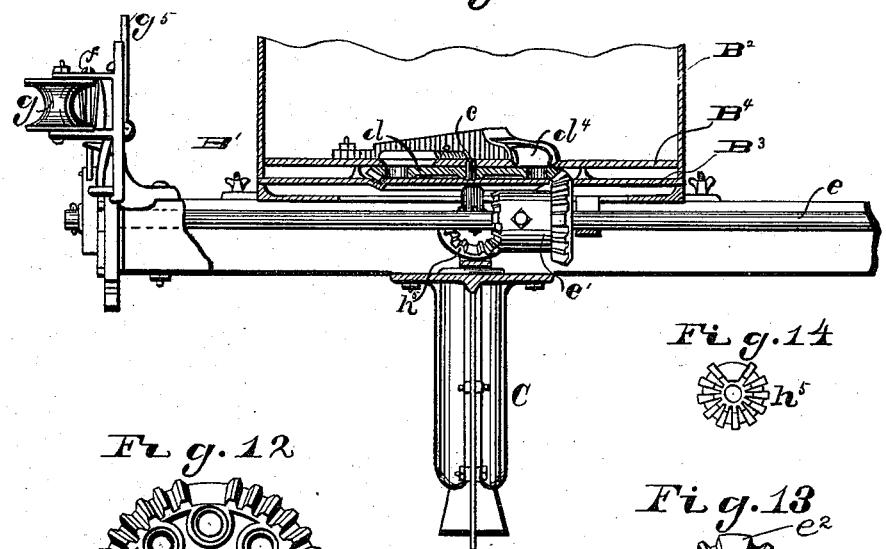
Figure 14:
Figure 12:
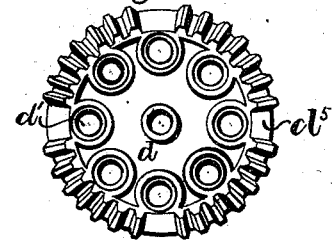
Figure 13:
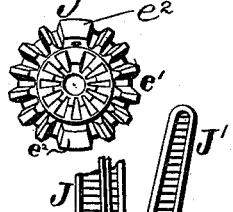
Figure 11:
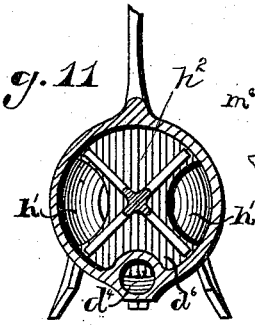

Figure 1 is a plan view of a corn-planter embodying my invention. Fig. 2 is a side elevation of the same. Fig. 3 is a transverse sectional elevation of one of the hoppers, showing the dropping mechanism and the hinged hopper. Fig. 4 is a plan of one of the hoppers, showing the dropping-plate. Fig. 5 is a longitudinal sectional view showing one of the hoppers and check-row dropping mechanism. Figs. 6, 6$^a$, 7, and 8 are front, end, and rear elevations of the check-rower mechanism. Fig. 9 is an elevation of the raising and lowering mechanism. Figs. 10 to 15 are detailed views hereinafter referred to.

Like parts are indicated by similar letters of reference throughout the several views.

The main frame of the machine is made in two parts A and A', hinged together at $A^2 A^2$. The hoppers B B are located on the front part of the frame A over the shoes C C in the usual way.

D D are the supporting-wheels, which are journaled on the rear part of the frame and run behind the shoes C C to cover the dropped grain.

The hoppers B B are supported on either side of the machine, and each made in two parts B' $B^2$, the lower or base part B' being secured rigidly to the cross-pieces $a$ $a$ of the front part of the frame. The upper part $B^2$ is hinged to the lower or base part B', and is adapted to be turned back, as indicated by dotted lines in Fig. 3. Between the parts B' $B^2$ of the hopper is a plate $B^3$, which is also hinged to the lower part B' and adapted to either turn with the upper part $B^2$ or separate therefrom. The plate $B^3$ is normally connected to the upper part $B^2$ of the hopper by a spring-catch $b$.

Supported on a small stud $c$ in the center of the plate $B^3$ is a dropping-disk $d$, which revolves through the grain at the bottom of the hopper, and is provided with a series of holes $d'$, adapted to retain a sufficient number of grains to form a hill and drop them through an opening $d^2$ in the plate $B^3$, from whence they fall through the tube $d^3$ into the shoe C. Above the disk $d$ is a removable plate $B^4$, which forms the bottom of the hopper proper, said plate being cut away over the holes $d'$ to allow the grain to enter therein, and being provided with a spring scraper or cut-off $d^4$, adapted to remove the surplus grain from the revolving disk in the usual way. The disk receives its motion from a shaft $e$ through a beveled gear $e'$, secured on said shaft and adapted to engage teeth on the under side of the disk $d$. In order that the disk $d$ may always be placed in the proper relation to the gear $e'$, and thus bring the holes in the said disk in their proper positions, I provide the gear $e'$ with two large teeth $e^2$, and the disk $d$ with large spaces $d^5$ to correspond.

The shaft $e$ extends entirely across the machine, and is adapted to drive the disks $d$ in each of the hoppers simultaneously through similar mechanism in each. On each end of the shaft $e$ is a small wheel $e^3$, provided with notches $e^4$ in the periphery thereof, four of said notches being preferably used. The wheel $e^3$ is provided with a hub $e^5$, which contains a similar number of notches or indentations $e^6$. On the hub $e^5$ is journaled a forked lever $f$, said lever being made in two pieces pivoted together at $f'$, as shown in Fig. 6<sup>a</sup>, the lower part $f^2$ thereof being made in the form of a ring adapted to encircle the hub, and the upper part $f^3$ being forked at the outer end and so pivoted that the inner end is adapted to act as a pawl to engage the notches in the hub $e^5$.

Secured at either end of the cross-pieces $a\ a$, just inside of the notched wheel $e^3$, is a frame or plate E, on which are journaled the usual guiding-pulleys $g\ g'$, adapted to support and guide the check-row wire, so that it shall pass through the forked end of the lever $f$.

The plate E is made in two parts E' E$^2$, the lower one E' of which is secured directly to the cross-pieces $a\ a$, the upper one E$^2$ being hinged to the lower one at $g^2$. The pulleys $g\ g'$ are each journaled to the upper plate E$^2$, the front pulley $g$, however, being adapted, when the hinged plate E$^2$ is in its normal position, to rest alongside of a supporting-lug $g^3$ on the lower plate E'. The pulley $g$ is thus inclosed on three sides when the plate E$^2$ is in its normal position, forming an opening behind said pulley through which the check-wire is passed before it reaches the forked lever $f$. On the hinged plate E$^2$ behind the pulley $g$ is a projecting finger $g^4$, which extends downwardly almost at right angles to the pulley $g$. The two parts of the frame E are connected together and held in their normal position by a cam-latch $g^5$, pivoted on the back side of the upper plate E$^2$ and adapted to engage a lug or projection on the lower plate E'. The upper end of the cam-latch $g^5$ is provided with a suitable connection $g^7$, extending to the seat within reach of the driver. The check-wire passes from the pulley $g$ through the forked lever $f$, thence under the pulley $g'$ and out. Each of the knots in the check-wire as the machine is drawn forward comes against the lever $f$ and draws it back, thus turning the shaft $e$. As soon as the knot passes the forked lever it is returned to its normal position against the stop $f^4$ by a spring $f^5$, which extends from said lever to an adjustable support $f^6$ on the lower plate E'. Pivoted on the upper plate E$^2$ is a spring-catch $e^7$, adapted, as the lever $f$ is drawn back by the wire, to bear against the periphery of the wheel $e^3$, and as the wheel is turned by the lever to enter in one of the notches $e^4$, and thus stop the shaft at just one-fourth of a revolution, or at such a point as will bring one of the holes in the disk $d$ over the hole $d^2$ in the plate B$^3$. As the forked lever is returned to its normal position by the spring $f^5$, a projection $f^7$ on the inside of said lever comes under a cam track or ledge $e^8$ on the spring-catch $e^6$, and thus raises said latch out of the notch $e^4$ and disengages the wheel $e^3$. As the upper end of the part $f^3$ of the forked lever comes against the stop $f^4$, the lower end thereof is forced into one of the notches $e^6$ on the hub ready for the next stroke.

It will be seen now that each of the knots on the check-wire revolves the disks $d$ sufficiently to bring one of the holes $d'$ over the hole $d^2$ in the plate B$^3$, thus dropping the grain therein through the tube $d^3$, from whence it falls into a conduit $d^4$, formed in the rear of the shoe C.

In the lower part of the shoe C is a partition $h$, provided on each side with openings $h'\ h'$. (See Fig. 11.) Above this partition $h$ is a revolving valve $h^2$, having four wings, adapted, when in its normal position, to divide the lower part of the shoe into four compartments, of which one $d^6$ is directly under the conduit $d^4$ and two over the openings $h'$. The valve $h^2$ is journaled at the bottom in the partition $h$, and is provided with a stem $h^3$, which extends up through the shoe proper, and, passing through a suitable bearing $h^4$, is provided at the top with a small beveled pinion $h^5$. The pinion $h^5$ is adapted to engage with a bevel-gear $h^6$, formed on the end of the hub of the gear $e'$, as shown in Fig. 5, by which it is turned one-fourth of a revolution at each stroke of the forked lever $f$, thus revolving the valve $h^2$ and carrying the contents of the compartment $d^6$ out of the openings $h'$. It will be seen that the grain forming one hill is thus dropped at the first stroke of the forked lever to the lower part of the shoe, and at the next stroke is dropped into the hill. By this arrangement the grain forming the hill is dropped directly into the hill as soon as the lever is moved by the check-wire, thus obviating the danger of scattering the grain by falling through a long passage after it is dropped.

If at any time it is desired to disengage the check-wire from the dropping mechanism, the cam-latch $g^5$ is drawn back by means of the connection $g^7$, thus disconnecting the two parts of the frame E, after which the further pulling of the connection $g^7$ will cause the upper part of the plate E$^2$ to turn on its hinges, as shown in Fig. 7. The wire is thus released from the pulley $g$ and falls on the finger $g^4$, which lifts it clear of the forked lever $f$.

The main frame, as before stated, is made in two parts hinged together at A$^2$. The rear hinged connection is attached to longitudinal pieces $i\ i$ on the rear part of the frame, the front hinged connection being secured directly to the cross-pieces $a\ a$ on the front part of the frame.

The wheels D D are journaled on each end of an axle F, which extends across the rear part of the frame and is secured to each of the longitudinal pieces $i\ i$ by means of a saddle $k$, said saddle being provided with side flanges $k'$, which extend up on each side of the longitudinal piece $i$, and is provided with an ear or lug $k^2$, extending downward on the side of the axle to receive a bolt $k^3$, which passes laterally through the axle. Extending across the rear part A' of the frame, parallel with the axle F, is a cross-bar $l$, secured at each end to the respective saddles $k$ $k$, and the longitudinal pieces $i$ $i$. Supported on the axle F and the cross-bar $l$, at or near the center thereof, is a ratchet-stand H, to which is pivoted a hand-lever J, a foot-lever J', and a treadle, foot-beam, or hoisting-lever J². These levers J J' J² are all pivoted at the same point $m$ between the ratchet-stand H and a bracket H', also secured to the axle and cross-bar. The treadle or foot beam J² extends longitudinally through the frame and is attached at the front end by means of a link $n$ to longitudinal pieces $a'$ $a'$, which are secured to cross-pieces $a$ $a$ on the forward part of the frame.

The longitudinal pieces $a'$ $a'$ at the front are provided with means for connecting the tongue K thereto, and are extended back at the rear to the point where the connection is made with the treadle J², which point is considerably back of the hinged connections A². Now it will be seen that by raising or lowering the rear end of the treadle J² the front part of the frame carrying the shoes will be lowered or raised, thus exerting more or less pressure on the said shoes.

The hand-lever J is independent of the treadle J² and is provided on one side with a double spring-bolt $m'$, adapted to engage with the ratchet-stand H, (see Fig. 15 for detail,) and is provided on the other side with a curved spur $m^2$, made integral therewith and adapted when the lever is moved to some extent in either direction to come against stops $m^3$ $m^4$, respectively, on the treadle J², the said stops being on opposite sides of the point where the treadle is pivoted. The foot-lever J' is also provided with a projecting spur $m^5$, adapted to come against a stop $m^6$ on the front part of the treadle J², and is also provided with a foot-latch $m^7$, adapted to hook over the front end of the spur $m^2$ on the hand-lever J when the rear end of the said spur is resting against the stop $m^3$ on the treadle J², as shown in Fig. 9. When the respective levers are in this relative position, it will be seen that a backward or forward movement of the hand-lever J will produce a corresponding vertical movement of the treadle J², and thus lower or raise the shoes C to a greater or less depth in the ground, the said shoes being adapted to be held at any desired depth by engaging the spring-bolt $m'$ with the ratchet-stand H. Now, if the foot-latch $m^7$ be released from the front end of the spur $m^2$ and the hand-lever J be moved forward until the front end of the spur comes against the stop $m^4$ on the treadle and locked in this position by the spring-bolt $m'$, it will be seen that the shoes will be held from coming out of the ground, but will be free to drop down independent of the wheels in case of a depression or in crossing a dead furrow. If with the lever in this position the weight of the forward frame should not be sufficient to press the shoes down quick enough or to the desired depth, the operator may by placing his foot on the top of the foot-lever J' force the said shoes down to any desired extent.

By placing the hand-lever in a central position, with both ends of the spur $m^2$ away from the treadle J², the shoes will be free to rise or fall at will, or they may be raised up or pressed down, as desired, by placing one foot on the foot-lever J' and the other on the rear end of the treadle J².

By the above-described mechanism it will be seen that the driver has complete control of the depth of the planting at all times.

The mechanism when in the position shown in Fig. 9 may be locked so that the shoes will be held against either upward or downward movement, or they may be locked in one direction only and adapted to be moved at will or under the control of the driver in the other direction, and this at any desired position of adjustment.

Figure 15:
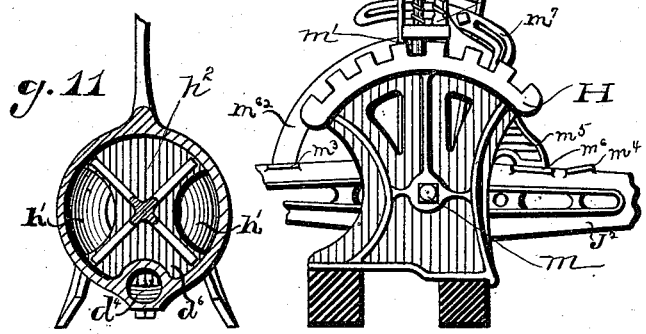

The double spring-bolt $m'$, as shown in Fig. 15, is composed of two separate bolts placed side by side with separate and independent springs, both of said bolts being connected to the same thumb-lever, the connection being made to the said bolts in such a manner that one bolt may drop into a notch in the ratchet-stand while the other rests on the top thereof. This is preferably accomplished by making the connection to a slotted hole in the top of the bolt, as shown. By this construction an adjustment of the lever may be obtained equal to one-half a notch.

The tongue K is attached to the front part of the frame and is capable of a vertical movement, whereby the front of said frame may be raised or lowered, the said frame turning on the hinged connections A². By this means the bottom of the shoes may be moved backward or forward in relation to the check-lever $f$, thus furnishing the means for bringing the hills in check. The cross-bar $l$ being extended across the frame parallel with the axle and connected with the longitudinal pieces $i$ by means of the saddle $k$, as above described, a very strong support is formed for the ratchet-stand. The saddle serves the double purpose of holding the parts of the frame rigidly together in their relative positions and of transmitting the strain from the ratchet-stand directly to the longitudinal pieces $i$ without the aid of the brace-rod usually used for this purpose.

I am aware that foot-treadles and hand-levers adapted to be connected together for the purpose of raising and lowering the planter-frame have been used. I am also aware that it is not new, broadly speaking, to use a valve in the shoe below the hopper for dropping the grain. I do not, therefore, claim these constructions broadly; but

What I claim, and desire to secure by Letters Patent, is—

1. The combination, with the longitudinal shaft and the guiding-pulleys, of the wheel on said shaft, the periphery and the hub of which are provided with an equal series of notches, a lever in two parts pivoted together, journaled on the hub of said wheel, said lever being forked above the pivoted connection and extended below said pivot to engage the notches in the hub of said wheel, a spring-catch adapted to engage the notches in the periphery of said wheel as the lever reaches the limit of its forward stroke, and a projection on said lever adapted to release said spring-catch when the lever is returned to its normal position, substantially as specified.

2. The combination, with the vibrating forked lever, of the supporting frame or plate made in two parts, one part being hinged to the other, which is stationary, the guiding-pulleys journaled on the hinged part, and a supporting-lug $g^3$ on the stationary part, adapted when in the normal position to rest alongside of the front pulley, and thus inclose the said pulley on three sides, so as to retain the check-wire therein, and means for turning said hinged portion and removing the pulley from said supporting lug, thus releasing the wire, substantially as set forth.

3. The combination, with the forked lever, of the hinged plate supporting the guiding-pulleys, the stationary supporting-lug adapted in the normal position to rest alongside of the front pulley and inclose the wire in said pulley, and a projecting finger on said plate adapted when the plate is turned to stand at right angles to and above said forked lever, substantially as and for the purpose set forth.

4. The combination, with the forked lever, of the hinged plate supporting the guiding-pulleys, the stationary supporting-lug adapted in a normal position to inclose the check-wire in the front pulley, the projecting finger on said hinged plate, a cam-latch adapted to lock said hinged plate in its normal position, and a connection to said cam-latch, whereby the said plate may be released and turned by the operator to discharge the wire, substantially as described.

5. The combination, with the grain-hopper and dropping mechanism therein, of the shoe under said hopper, having an independent conduit $d^4$ on one side thereof, a partition provided with an opening therein under said conduit, and a revolving winged valve between said partition and conduit, the wings of said valve being adapted to extend under and form a pocket below said conduit to receive the grain dropped from the hopper at each stroke and discharge it at the next stroke, substantially as set forth.

6. The combination, with the shaft, the ratchet-wheel, and jointed forked lever thereon, and the spring-catch to engage said ratchet-wheel, of the double-beveled gear on said shaft, the hinged hopper having the dropping-disk therein, and the shoe under said hopper having a conduit therein and a winged valve under said conduit, said dropping-disk and winged valve being adapted to be revolved from said double gears on opposite sides thereof, substantially as specified.

7. The combination, with the frame made in two parts, of the adjusting foot-treadle pivoted on the rear portion of said frame and connected to the front portion, as specified, an independent foot-lever adapted to bear against said treadle, and an independent hand-lever adapted to be connected to said foot-lever, substantially as set forth.

8. The combination, with the foot-treadle, of the foot-lever having the projecting spur adapted to come against said treadle on one side of the center, a hand-lever with a projecting spur adapted to come against the treadle on either side of the center, and a foot-latch adapted to connect said hand-lever and foot-lever, substantially as specified.

9. The combination, with the hand-lever and the ratchet-stand provided with a series of notches, of the double spring-bolt, the latches of which are separated by a space equal to half the distance between the notches in the ratchet-stand, substantially as and for the purpose set forth.

10. The combination, with the main frame in two parts, the rear portion of which is provided with the axle and longitudinal frame-pieces, of the cross-bar parallel with said axle and connecting said longitudinal frame-pieces, the saddles adapted to connect said frame-pieces with the axle and cross-piece, respectively, and a ratchet-stand on said cross-piece, substantially as and for the purpose set forth.

In testimony whereof I have hereunto set my hand this 3d day of March, A. D. 1886.

JOHN KELLY.

Witnesses:
H. H. WILLIAMS,
PHILIP VANCE.